(12) United States Patent
Allard

(10) Patent No.: US 10,473,068 B2
(45) Date of Patent: Nov. 12, 2019

(54) KIT FOR SEALING JOINTS OF MOTORCYCLE INTAKE MANIFOLD WITH CYLINDER HEADS

(71) Applicant: Eric Gerard Allard, Mulberry, FL (US)

(72) Inventor: Eric Gerard Allard, Mulberry, FL (US)

( * ) Notice: Subject to any disclaimer, the term of this patent is extended or adjusted under 35 U.S.C. 154(b) by 622 days.

(21) Appl. No.: 14/727,034

(22) Filed: Jun. 1, 2015

(65) Prior Publication Data

US 2016/0348624 A1   Dec. 1, 2016

(51) Int. Cl.
| *F02M 35/10* | (2006.01) |
| *F02M 35/116* | (2006.01) |
| *F02M 35/16* | (2006.01) |
| *F16L 27/107* | (2006.01) |

(52) U.S. Cl.
CPC ......... *F02M 35/10288* (2013.01); *F02M 35/10078* (2013.01); *F02M 35/10144* (2013.01); *F02M 35/10321* (2013.01); *F02M 35/10327* (2013.01); *F02M 35/10354* (2013.01); *F02M 35/116* (2013.01); *F02M 35/162* (2013.01); *F16L 27/107* (2013.01)

(58) Field of Classification Search
CPC ....... F02M 35/10288; F02M 35/10321; F02M 35/10327; F02M 35/10354; F02M 35/116; F02M 35/162; F02M 35/10078; F02M 35/10144

See application file for complete search history.

(56) References Cited

U.S. PATENT DOCUMENTS

2007/0221169 A1* 9/2007 Konno ............. F02M 35/10085
123/400

\* cited by examiner

*Primary Examiner* — Sizo B Vilakazi
(74) *Attorney, Agent, or Firm* — Cygnet IP Law, P.A.; Stephen W. Aycock II

(57) ABSTRACT

A kit maintains a seal of a joint of a fuel intake port member of a cylinder head and a fuel distribution port member of an intake manifold of a Harley Davidson® motorcycle with panhead, ironhead or shovelhead engine. The kit includes an elastomeric band and a pair of circular clamps.

3 Claims, 11 Drawing Sheets

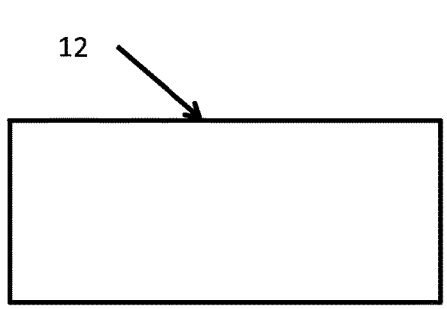
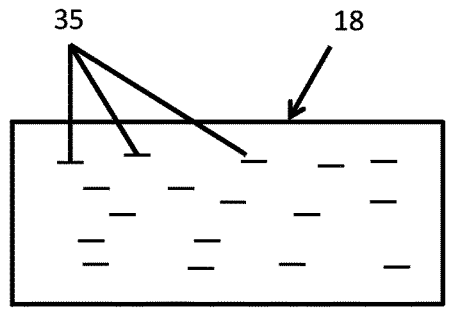
Fig. 11a
PRIOR ART
Fig. 11b
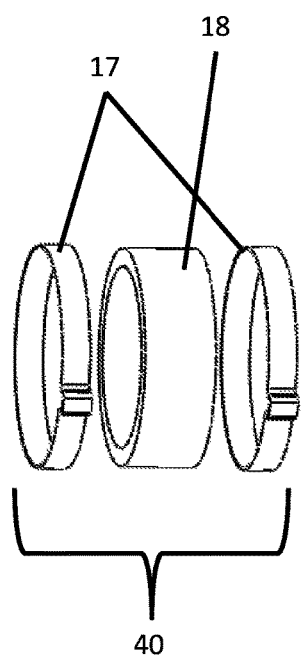
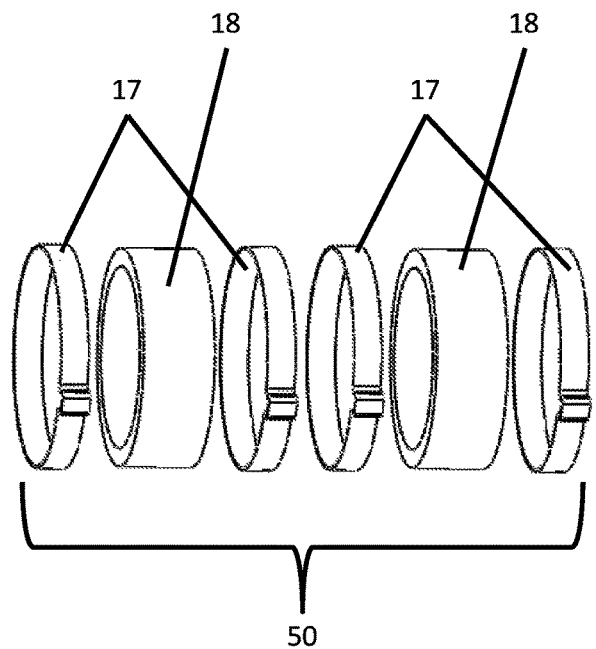
Fig. 12
Fig. 13

KIT FOR SEALING JOINTS OF MOTORCYCLE INTAKE MANIFOLD WITH CYLINDER HEADS

FIELD OF THE INVENTION

The present invention relates to a parts for sealing the connection of an intake manifold and cylinder head of 1955 to 1985 Harley Davidson® motorcycles with engines of types commonly referred to as panhead, ironhead and shovelhead designs.

Background of the Invention

The current designs for the fuel intake systems of 1955 to 1985 Harley Davidson® motorcycles with engines of types commonly referred to as panhead, ironhead and shovelhead designs have a poorly designed seal method that results in a leaking fuel intake assembly. A leaking fuel intake assembly causes hard starting, lean fuel and air mixture, and possible damage to the engine. The current designs use one clamp to seal two round surfaces together which does not flex and stay sealed to each port. The kit of the present invention provides two clamps, one per port, which allows the fuel intake port member of the cylinder head to move slightly independently from the fuel distribution port member of the e manifold and maintain the seal. The kit of the present invention new design also replaces the rubber seal with a reinforced silicone hose type seal for added strength and sealing.

Discussion of the Prior Art

Intake manifold leaks in 1955 to 1985 Harley Davidson motorcycles with engines of types commonly referred to as panhead, ironhead and shovelhead designs has long been a recognized problem. This leak problem allows air to leak into the motorcycle engine affecting the objective fuel to air ratio causing difficult starting and inefficient running of the engine. The widespread nature of this problem is evidenced by the number of online chat rooms dedicated to this problem, some examples of which are: The Sportster and Buell Motorcycle Forum, Ironhead intake manifold leak plague, 2000-2015, [retrieved on 2015-05-26]. Retrieved from the Internet: <URL: http://xlforum.net/vbportal/forums/archive/index.php/t-1079081.html, which has postings such as "does anyone have any ideas to once and for all solve the problem of the intake manifold leaks on ironheads? i have the flat seal type gaskets on my 78 sporty. i have done every thing i think that i can to try and fix this. such as setting the manifolds before tightening the jugs, they are lined up perfectly. new rubber flat seals. tried to different styles of clamps. used silicone on and around head and manifold flanges. im out of ideas. anyone have any?" Replacement parts and conversion kits intended to address this problem are available on the open market for example: CAS4, online sales catalog, intake manifold sealing devices for Harley Davidson panhead, ironhead and shovelhead engines, [retrieved on 2015-05-26]. Retrieved from the Internet: <URL: http://www.cas4.com/Carburetors-Intakes/carbs-intakes-manifolds-kits-seals-hardware.html.

SUMMARY OF THE INVENTION

There is provided in accordance with the present invention a kit for maintaining a seal of a joint of a fuel intake port member of a cylinder head and a fuel distribution port member of an intake manifold of a Harley Davidson® motorcycle with a panhead, ironhead or shovelhead engine, wherein the fuel intake port member has a length and the output port member has a length, the kit comprising an elastomeric band and a pair of circular clamps, the elastomeric band having a longitudinal length that is longer than the length of either of the fuel distribution port member or the fuel intake port member but not longer than the combined lengths of the fuel distribution port member and the fuel intake port member, and each of the circular clamps having a longitudinal length that is less than the length of either of the fuel distribution port member or the fuel intake port member. The elastomeric band may comprise a fiber reinforced silicone. There is provided in accordance with another aspect of the present invention a method of installing the components of the kit to seal a joint of a fuel intake port member of a cylinder head and a fuel distribution port member of an intake manifold of a Harley Davidson® motorcycles with panhead, ironhead or shovelhead engine.

BRIEF DESCRIPTION OF THE DRAWINGS

FIG. 11a is a cross section of prior art sealing gasket and FIG. 11b is a cross section of a preferred sealing band used in the practice of the present invention.

FIG. 12 shows the components of a kit according to one aspect of the invention.

FIG. 13 shows the components of a kit according to another aspect of the invention.

DETAILED DESCRIPTION OF THE INVENTION

Figure 1:
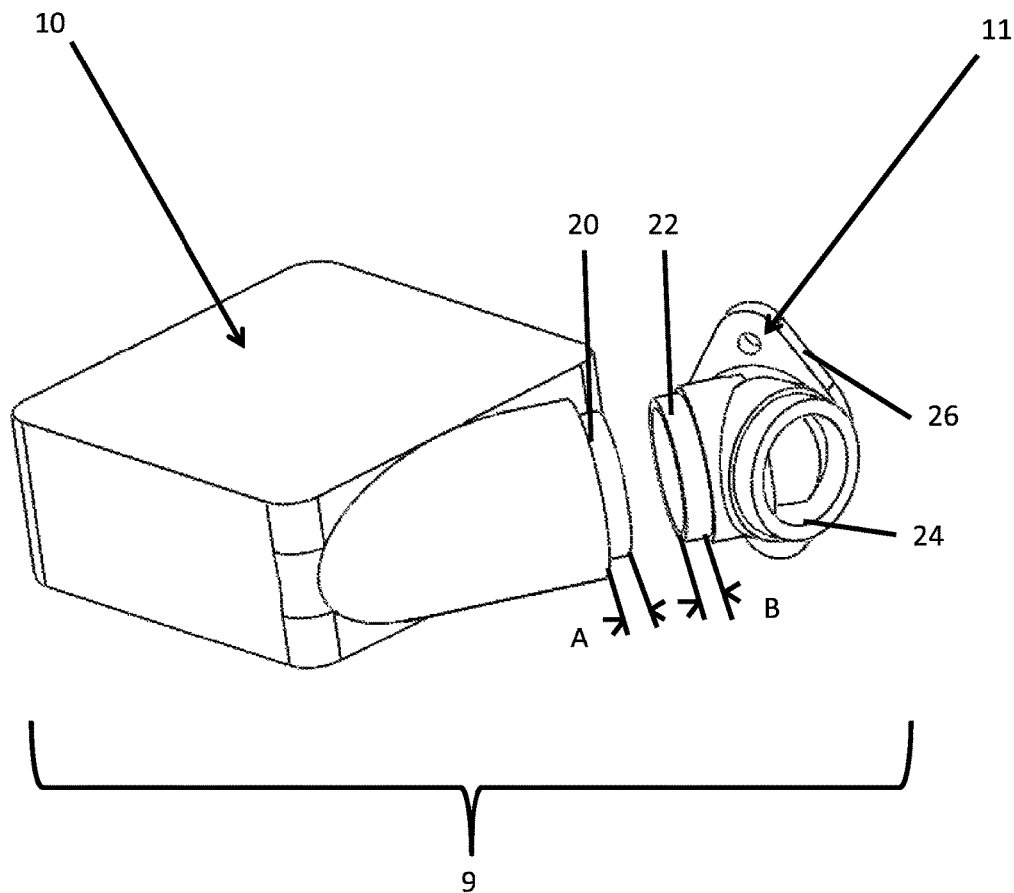
FIG. 1 is a schematic representation in an unassembled state of a single generic prior art cylinder head and a generic prior art intake manifold of a 1955 to 1985 Harley Davidson® motorcycle with engines of types commonly referred to as panhead, ironhead and shovelhead designs.

Referring first to FIG. 1 there is shown an exploded view of a generic prior art sub assembly 9 of comprising a cylinder head 10 and an intake manifold 11 of a Harley Davidson® motorcycle with a panhead, ironhead or shovelhead engine. Harley Davidson is a registered trademark of H-D U.S.A., LLC, a limited liability company of Wisconsin, 3700 West Juneau Avenue, Milwaukee, Wis. 53208.

The panhead is a Harley-Davidson motorcycle engine, so nicknamed because of the distinct shape of the rocker covers. The engine is a two-cylinder, two-valve-per-cylinder, pushrod V-twin. The engine replaced the Knucklehead engine in 1948 and was manufactured until 1965 when it was replaced by the shovelhead engine. The ironhead is a Harley-Davidson motorcycle engine, so named because of the composition of the cylinder heads. The engine is a two cylinder, two valves per cylinder, pushrod V-twin. It was produced from 1957 until 1985, and this name may also be applied to the Harley Davidson® Sportster motorcycles that used this engine. The shovelhead is an air-cooled, 45 degree, V-twin motorcycle engine manufactured from 1966 to 1985 by Harley-Davidson. As the design of Harley-Davidson® engines evolved through the years, the distinctive shape of the valve covers has allowed Harley enthusiasts to classify an engine simply by looking at the shape of the covers, and the panhead engine has covers resembling an upside-down pan. The shovelhead engine has covers resembling the head of coal shovels when inverted. These engine names are terms of art that are well known to motorcycle enthusiasts, mechanics and dealers. Purveyors of replacement parts label and advertise parts for use by these engine designations.

In FIG. 1 only a single generic cylinder head 10 is shown for simplicity, it being understood that a panhead, ironhead or shovelhead motorcycle engine has two cylinder heads, each of which is associated with a cylinder block (not shown) provided with a combustion cylinder. Each cylinder head is provided with a fuel intake port member 20 for receiving a mixture of air and fuel to be distributed to a combustion cylinder. Every internal combustion engine is designed to operate most efficiently when supplied with a predetermined range of mixtures of air and fuel. Providing an inappropriate mixture of air and fuel, especially too much air, can cause hard starting, rough operation and possible excess wear of engine parts. Only one intake manifold 13 is needed for an engine because the intake manifold is provided with two fuel distribution port members 22, 24. Harley enthusiasts and mechanics commonly refer to the fuel distribution port members as "spigots". The primary function of the intake manifold is to evenly distribute the combustion mixture of air and fuel to the cylinder heads. The intake manifold may also provide a mount 26 for a carburetor, throttle body, and other components (not shown) of the engine.

With reference to FIG. 1 the fuel intake port member 20 of the cylinder head 10 is tubular, and the fuel distribution port members 22, 24 of the intake manifold 13 are tubular. By design in panhead, ironhead and shovelhead engines the fuel intake port member 20 of a cylinder head has a length A of about 0.375 (⅜) inch as measured longitudinally that projects from a main body of the cylinder head. By design in panhead, ironhead and shovelhead engines the fuel distribution port members 22, 24 of the intake manifold 13 have a length B of about 0.375 (⅜) inch as measured longitudinally that project from a main body of the intake manifold. By design in panhead, ironhead and shovelhead engines the tubular fuel intake port member 20 of the cylinder head 10 and the tubular fuel distribution port members 22, 24 of the intake manifold 13 have outside diameters of about two inches and inside diameters of about 1.675 (1⅝) inches.

Figure 2:
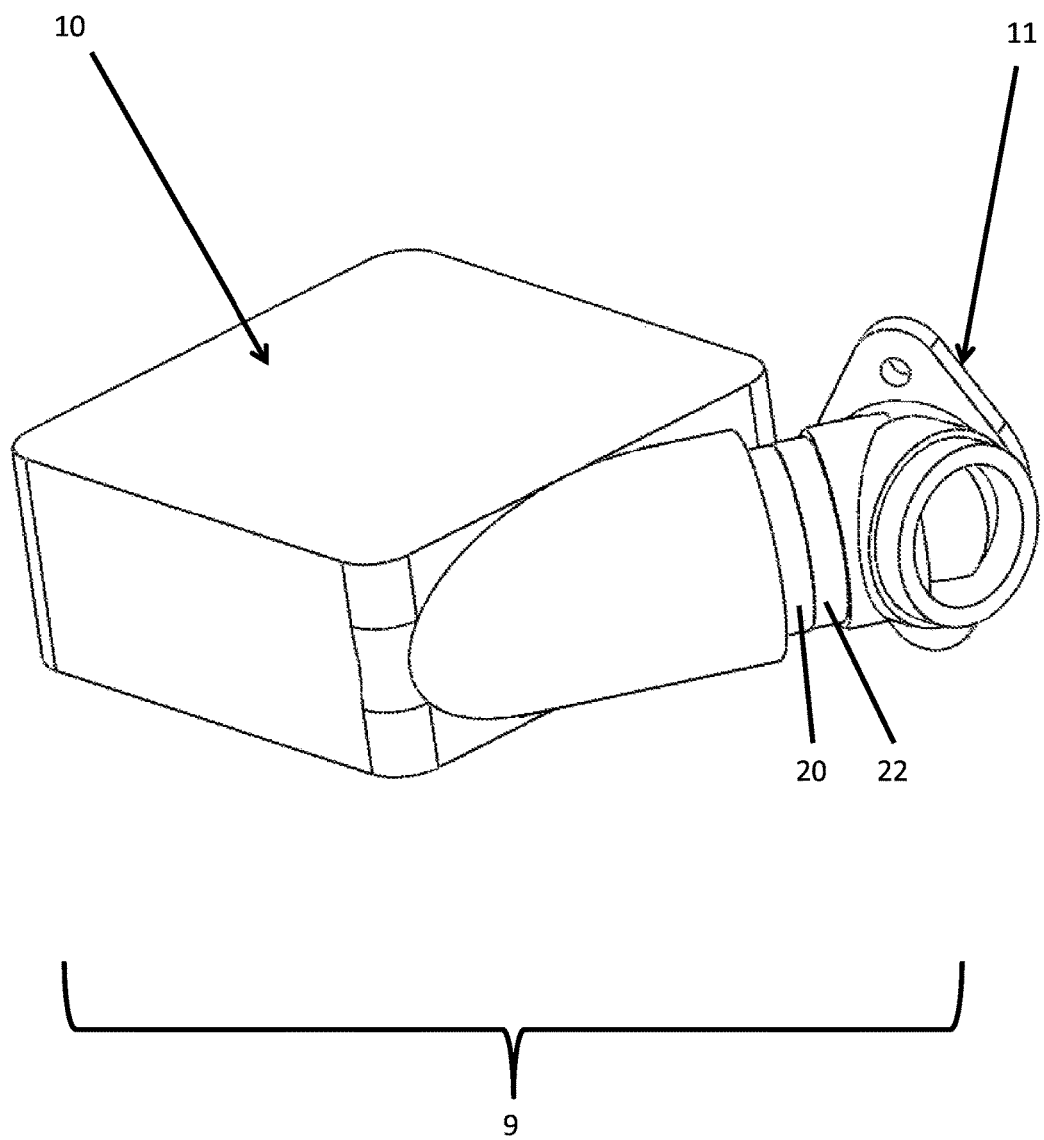
FIG. 2 shows the generic prior art cylinder head with the fuel distribution port member of the generic prior art intake manifold in its' operative position aligned with the fuel intake port member of the generic prior art cylinder head.

FIG. 2 shows the sub assembly 9 comprising the generic prior art cylinder head 10 and the generic intake manifold 11 with the fuel distribution port member 22 of the intake manifold in its' operative position aligned with and preferably abutting or spaced apart by not more than about 0.125 (⅛) inch from the fuel intake port member 20 of the cylinder head. It is this gap between the ends of the fuel distribution port member and the fuel intake port member that is a major factor in the problem of poor sealing of this joint in the prior art. Another factor in the problem of poor sealing of this joint in the prior art can be a variation in the outside diameters of the tubular fuel intake port member 20 of the cylinder head 10 and the tubular fuel distribution port members 22, 24 due to manufacturing tolerances or wear. Another factor in the problem of poor sealing of this joint in the prior art can be scratches in the outer circumferential surfaces of the tubular fuel intake port member 20 of the cylinder head 10 and/or the tubular fuel distribution port members 22, 24.

Figure 3:
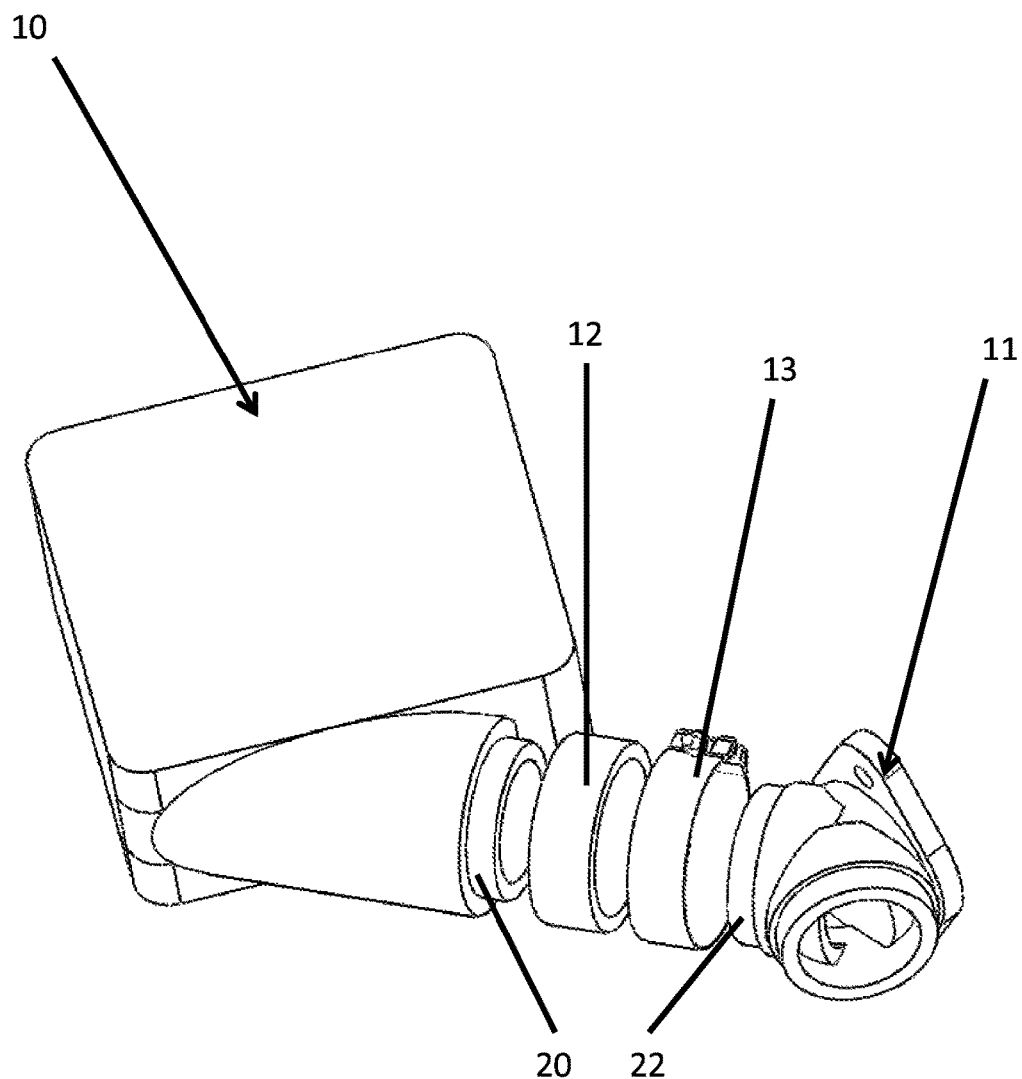
FIG. 3 is an exploded view of the generic prior art cylinder head and the generic prior art intake manifold with the prior art components of a first prior art arrangement for sealing the joint of the fuel distribution port member of the intake manifold with the fuel intake port member of the cylinder head.
Figure 4:
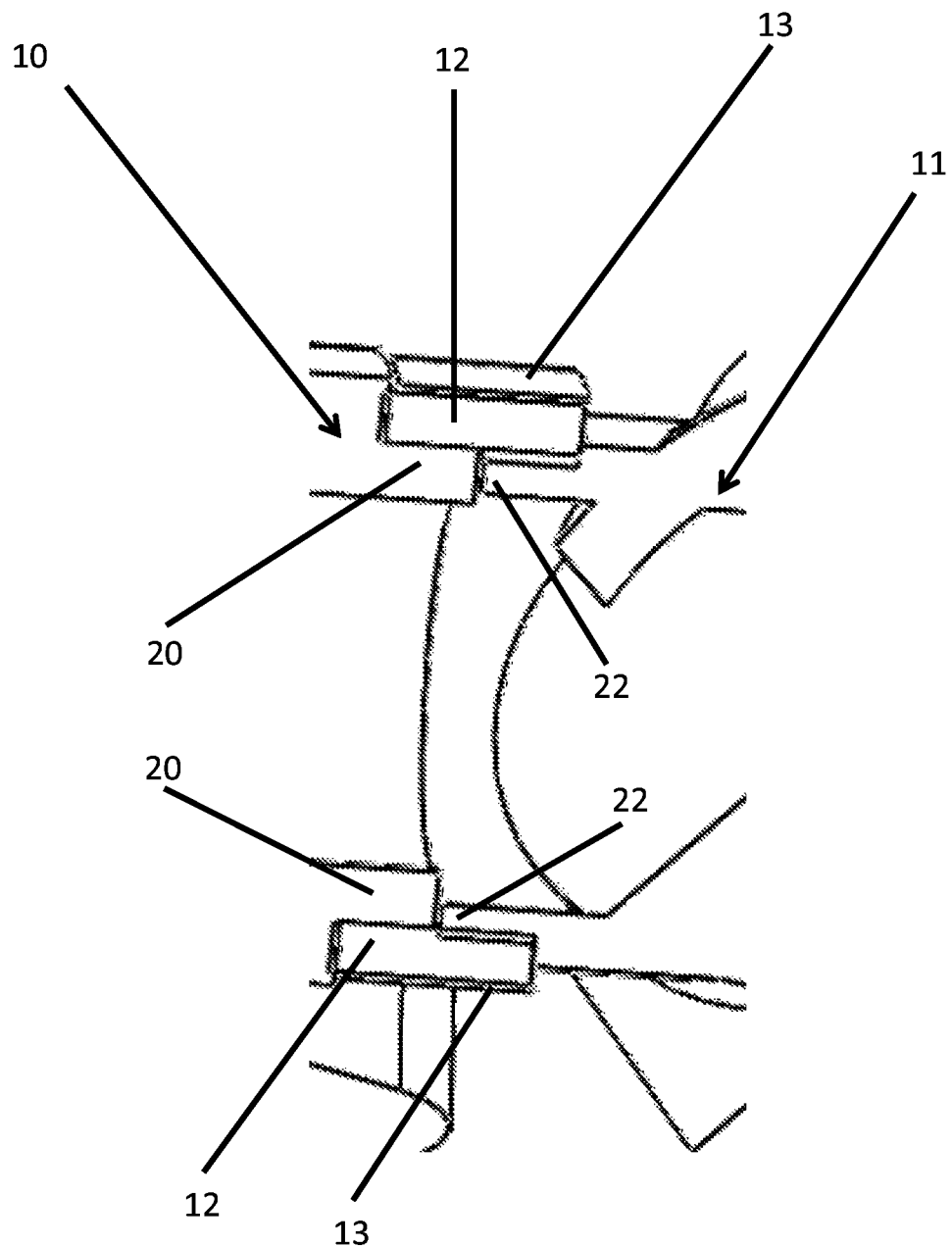
FIG. 4 is a schematic cross section of the sealed assembly of the generic prior art cylinder head and intake manifold with the prior art components of the first prior art arrangement for sealing the joint of the fuel distribution port member of the intake manifold with the fuel intake port member of the cylinder head.

FIG. 3 is an exploded view of the generic prior art cylinder head 10 and the generic prior art intake manifold 11 with the prior art components 12, 13 of a first prior art arrangement for sealing the joint of the fuel distribution port member 22 of the intake manifold abuts the fuel intake port member 20 of the cylinder head. FIG. 4 is a schematic cross section of the sealed assembly of the generic prior art cylinder head 10 and generic prior art intake manifold with the prior art components 12, 13 of the first prior art arrangement for sealing the joint of the fuel distribution port member 22 of the intake manifold with the fuel intake port member 20 of the cylinder head. The prior art rubber sealing band 12 is referred to by Harley enthusiasts and mechanics as a rubber band seal because it is essentially an unreinforced rubber band that is about 0.75 (¾) inch wide and has an inside diameter of about two inches and an outside diameter of about 2.25 (2¼) inches. The prior art circular clamp 13 has a width of about 0.25 (¾) inch and is adjustable over a range of diameters for installation to apply a compressive force to an outer circumference of the rubber band seal 12 as shown in FIG. 4 The prior art sealing design using a single circular clamp may not provide a satisfactory seal, and is widely recognized as not providing satisfactory seals because while the rubber band seal may be adequately pressed against the outer circumferential surface of either the fuel intake port member 20 or the fuel distribution port member 22, it may not be adequately pressed against the outer circumferential surface of the other port member because one of the port members has an outer diameter at or near the minimum specified tolerance and the other port member has an outer diameter at or near the maximum specified tolerance, or an outer circumferential surface of one or both of the port members may not be perfectly round. Assembly of a prior art intake manifold with a pair of prior art cylinder heads is not an easy task. A rubber band seal must be positioned receiving both of the tubular fuel distribution port members of the intake manifold and the fuel intake port members and then a circular clamp, usually a T-bolt circular clamp must be installed around each of the rubber band seals.

Figure 5:
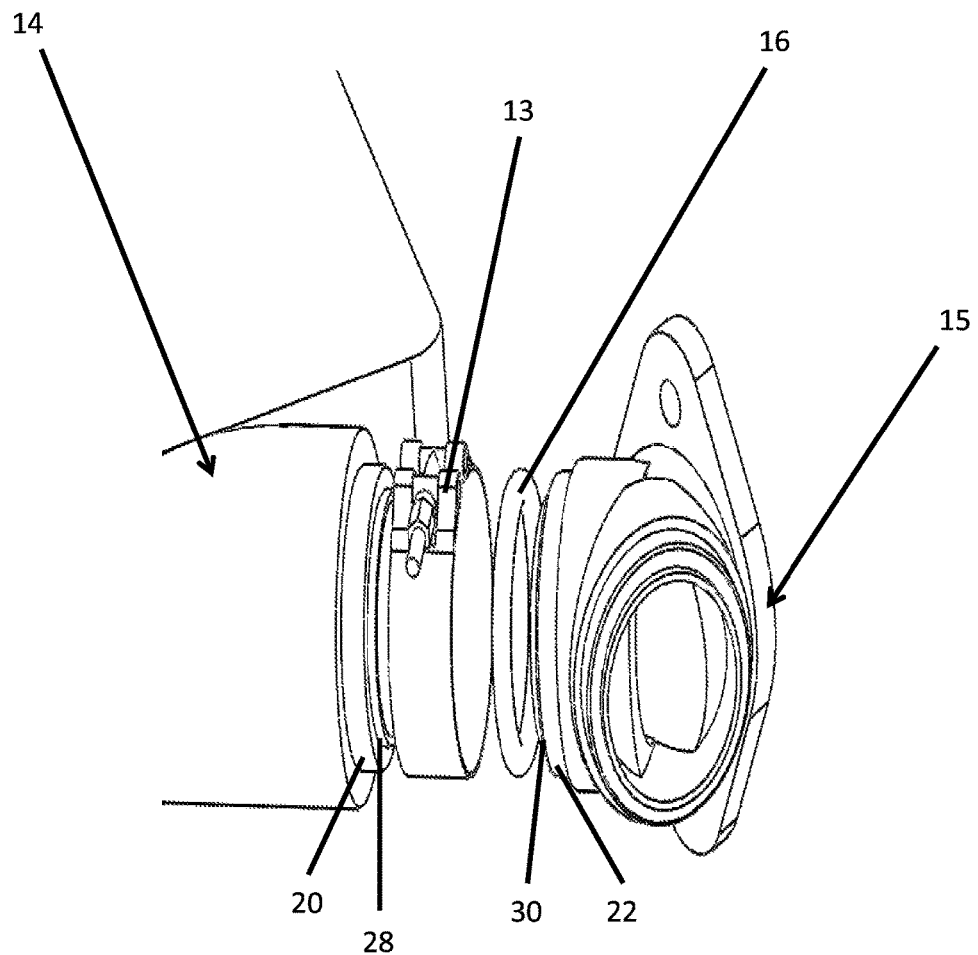
FIG. 5 is an exploded view of another generic prior art cylinder head and another generic prior intake manifold with the prior art components of a second prior art arrangement for sealing the joint of a fuel distribution port member of the intake manifold with a fuel intake port member of the cylinder head.
Figure 6:
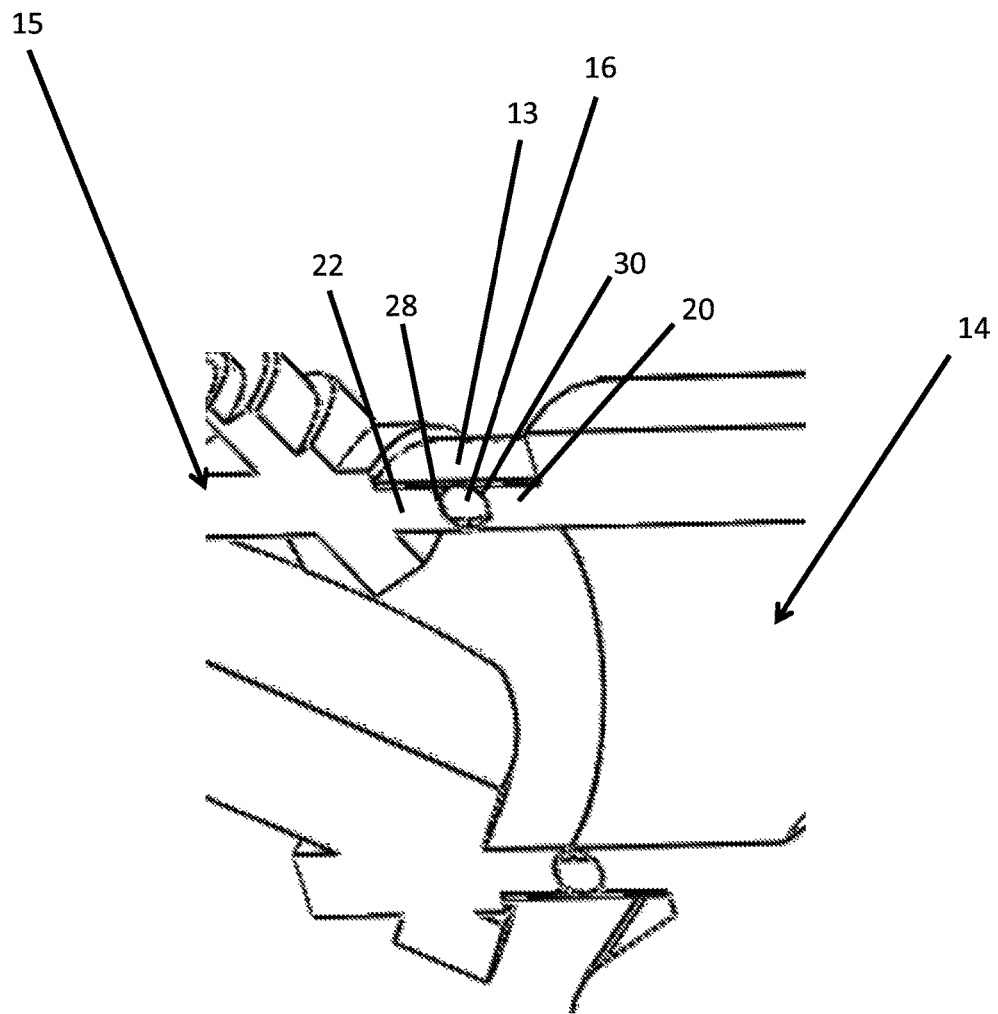
FIG. 6 is a schematic cross section of the sealed assembly of the second generic prior art cylinder head and second generic prior art intake manifold with the prior art components of the second prior art arrangement for sealing the joint where the fuel distribution port member of the intake manifold is joined to the fuel intake port member of the cylinder head.

Harley Davidson attempted to alleviate the problems described in the preceding paragraph regarding leaks of air into the fuel intake port members of the cylinder heads by modifying the design of the joints and the sealing structure. FIG. 5 is an exploded view of another generic prior art cylinder head 14 and generic prior art intake manifold 15 with the prior art components 13, 16 of a second prior art arrangement for sealing the joint of a fuel distribution port member 22 of the intake manifold with a fuel intake port member 20 of the cylinder head. FIG. 6 is a schematic cross section of the sealed assembly of the second generic prior art cylinder head 14 and second generic prior art intake manifold 15 with the prior art components 13, 16 of the second prior art arrangement for sealing the joint where the fuel distribution port member 22 of the intake manifold is joined to the fuel intake port member 20 of the cylinder head. In this revised sealing arrangement the fuel intake port member 20 of the cylinder head has a step down ledge 28 machined into it, and the intake port member and the fuel distribution port member 22 of the intake manifold has a step down ledge 30 machined into it. When the two step down ledges 28, 30 are moved into at least substantial alignment and into contact or at least close proximity they act in concert to provide a circumferentially extending groove like structure for receiving a rubber O ring 16. A circular clamp 13, usually a T-bolt circular clamp must be installed around the fuel intake port member 20 of the cylinder head and the fuel distribution port member 22 of the intake manifold as shown in FIG. 6 to apply compression to the O ring 16 and maintain the joint of the fuel intake port member and the fuel distribution port member. It is understood that the intake manifold is secured to a second cylinder head (not shown) in and seals the joint in the same manner. Unfortunately the same problems of air leaking into the cylinder head via unsatisfactory seals of the joints set forth above are also experienced with this second prior art arrangement for sealing the joint where the fuel distribution port member of the the intake manifold is joined to the fuel intake port member of the cylinder head.

The sealing problems encountered in the prior art as discussed above with respect to FIGS. 1-6 can be alleviated by installing the components of a new kit for sealing joints of a motorcycle intake manifold with cylinder heads as disclosed herein. Referring to FIG. 12 there is shown a first kit 40 comprising one reinforced silicone elastomeric band 18 and two circular clamps 17. Referring to FIG. 13 there is shown a second kit 50 comprising two reinforced silicone elastomeric bands 18 and four circular clamps 17. Any suitable circular clamps selected for size, strength and ease of installation may be used with examples of circular clamps being T-bolt circular clamps, worm gear circular clamps, and crimping circular clamps. FIG. 11a shows a schematic cross section of a prior art rubber band clamp 12 that has been used as a sealing member in the prior art sealing arrangements discussed above with respect to FIGS. 1-4. The prior art rubber band seal is not provided with any fabric reinforcement. FIG. 11b shows a schematic cross section of a reinforced elastomeric band 18 of a type suitable to be provided in the kit of the present invention. Preferably the elastomeric band 18 comprises silicone that is reinforced with at least three plies of polyester or nylon. A prototype kit of the present invention is provided with an exemplary elastomeric band of silicone reinforced with three plies of nylon, an inside diameter of two inches, a wall thickness of about four millimeters, a burst pressure of about two hundred and forty five pounds per square inch, and can operate within a minimum temperature range of about −65° F. to about 350° F. However it is understood that any fabric reinforced elastomeric band selected in accordance with good engineering practices may be employed in the kit of the present invention.

Figure 7:
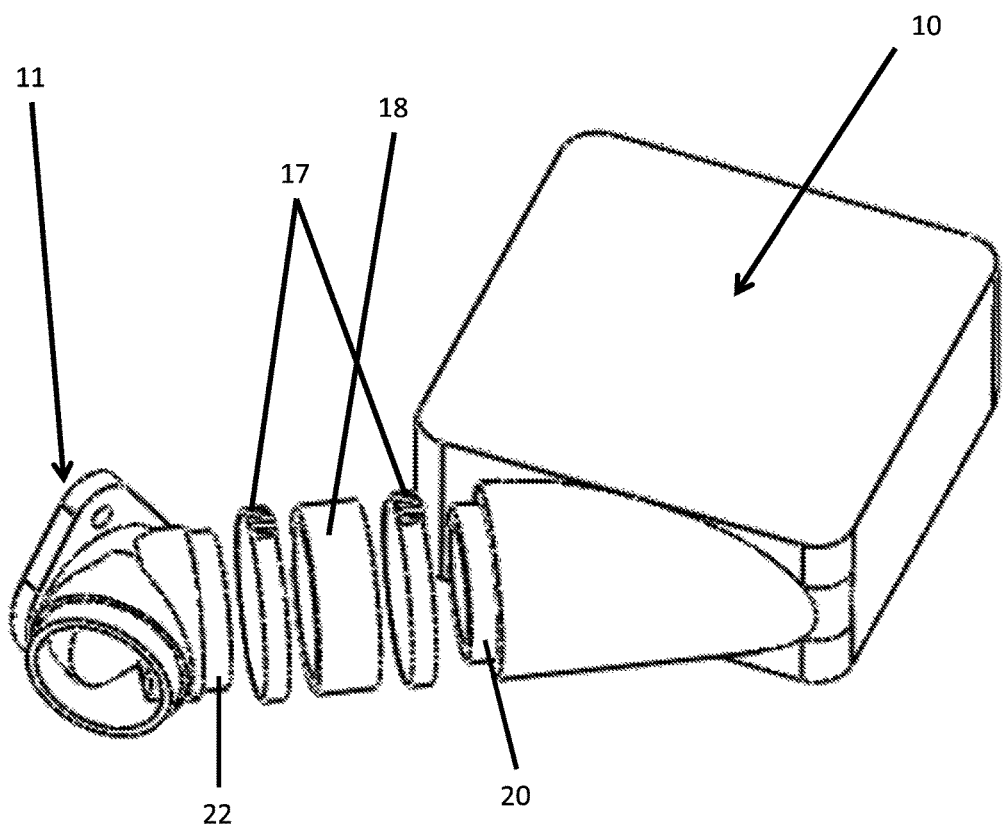
FIG. 7 is an exploded view of the generic prior art cylinder head and intake manifold of FIGS. 1-4 with the components of a new kit for sealing the joint where the fuel distribution port member of the intake manifold is joined to the fuel intake port member of the cylinder head.
Figure 8:
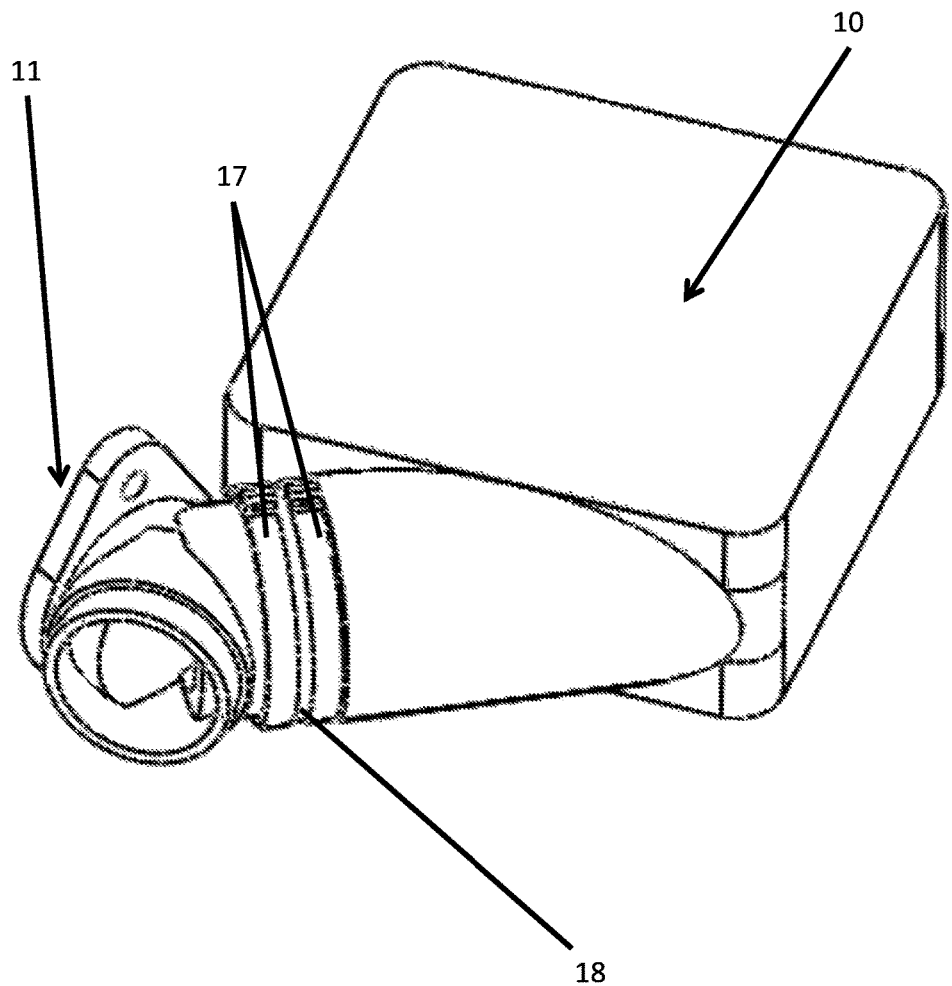
FIG. 8 is a pictorial view of the generic prior art cylinder head and intake manifold of FIGS. 1-4 assembled with the components of the new kit for sealing the joint where the fuel distribution port member of the intake manifold is joined to the fuel intake port member of the cylinder head in place of the first prior art sealing arrangement of FIGS. 1-4.
Figure 9:
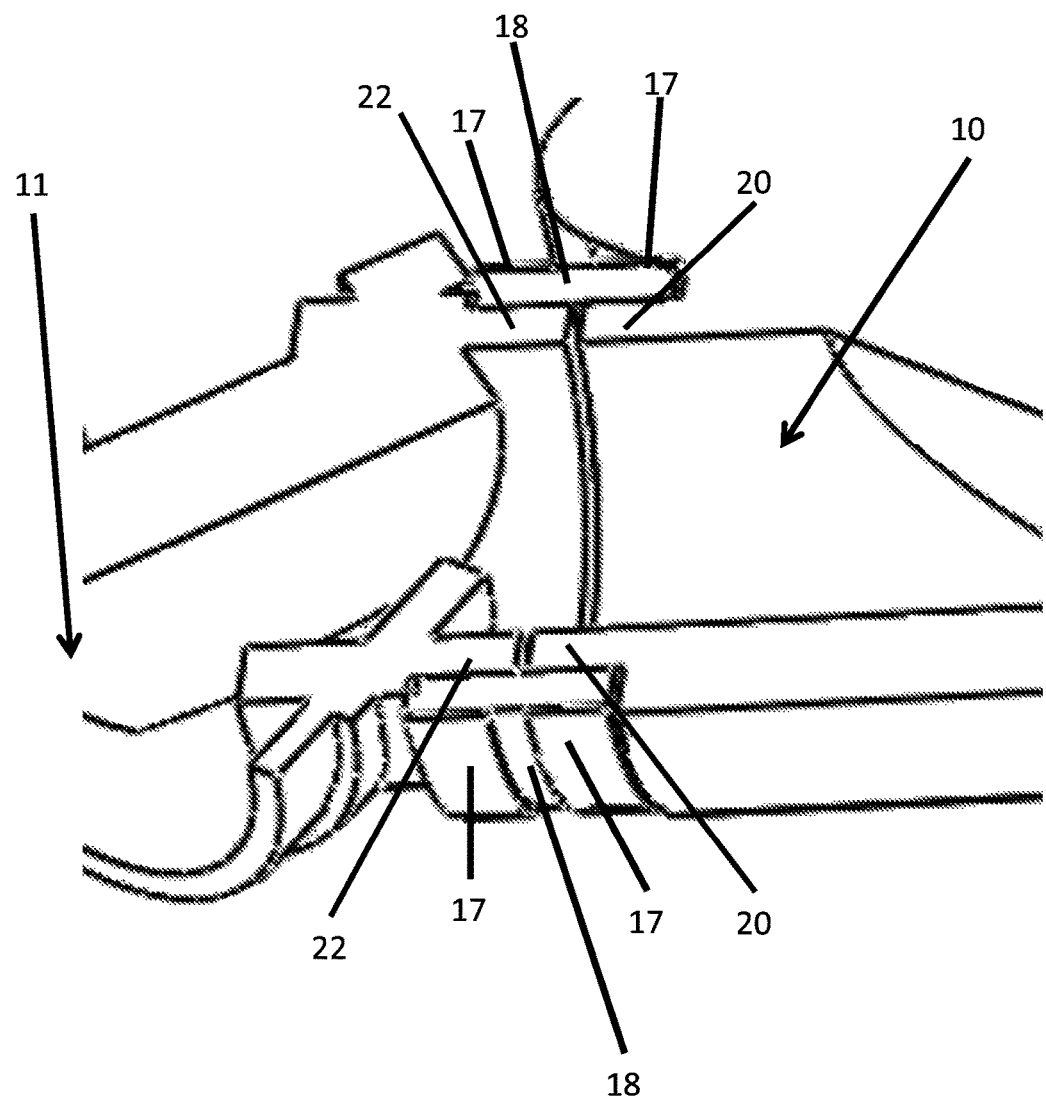
FIG. 9 is a schematic cross section of the sealed assembly of the generic prior art cylinder head and intake manifold of FIGS. 1-4 with the components of the new kit sealing the joint where the fuel distribution port member of the intake manifold is joined to the fuel intake port member of the cylinder head in place of the first prior art sealing arrangement of FIGS. 1-4.

FIG. 7 is an exploded view of the generic prior art cylinder head 10 and intake manifold 11 of FIGS. 1-4 with the components 17, 18 of a new kit for sealing the joint where the fuel distribution port member 22 of the intake manifold is joined to the fuel intake port member 20 of the cylinder head. FIG. 8 is a pictorial view of the shown in FIG. 7 assembled for sealing the joint where the fuel distribution port member to the fuel intake port member using the new kit in place of the first prior art sealing arrangement of FIGS. 1-4. FIG. 9 is a schematic cross section of the sealed assembly of the sealed assembly incorporating the components 17, 18 of the new kit in place of the first prior art sealing arrangement of FIGS. 1-4. It is understood that the intake manifold is sealed to a second cylinder head (not shown) in this same manner.

Figure 10:
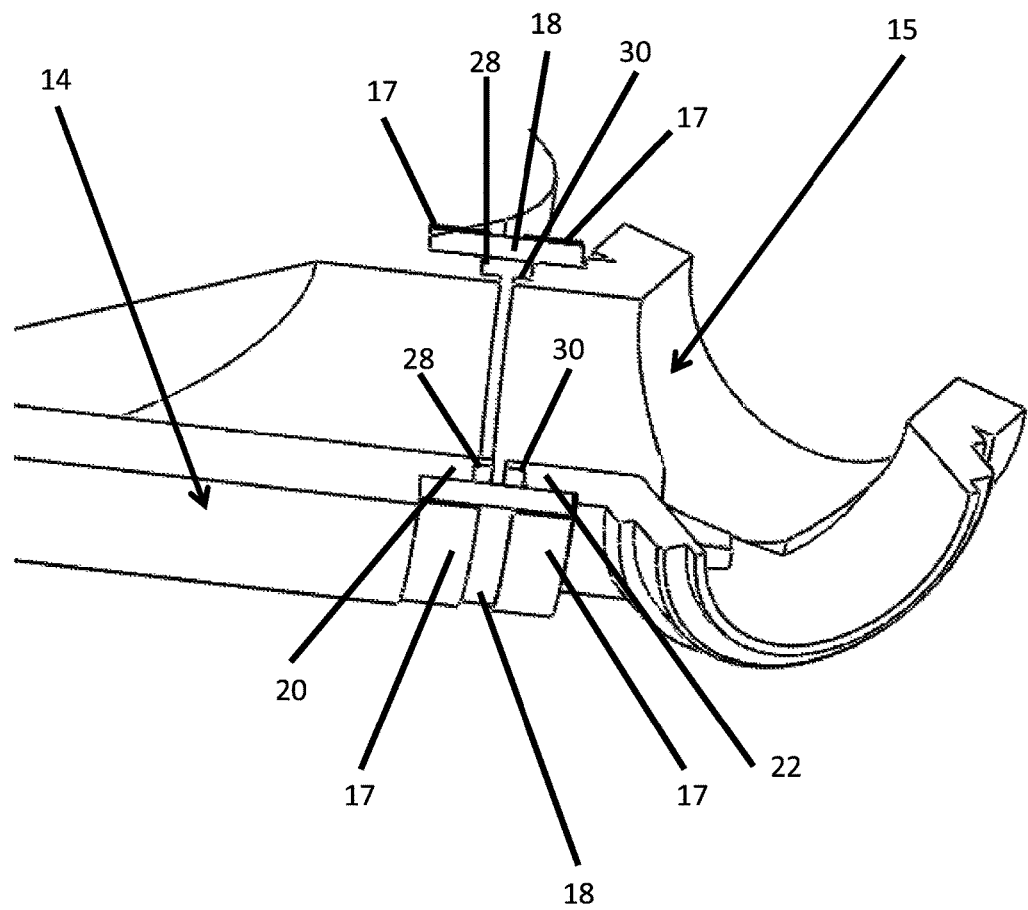
FIG. 10 is a schematic cross section of the sealed assembly of the generic prior art cylinder head and intake manifold FIGS. 5-6 with the components of the new kit sealing the joint where the fuel distribution port member of the intake manifold is joined to the fuel intake port member of the cylinder head in place of the second prior art sealing arrangement of FIGS. 5 and 6.

FIG. 10 is a schematic cross section of the sealed assembly of the generic prior art cylinder head 14 and intake manifold 15 FIGS. 5-6 with the components 17, 18 of the new kit sealing the joint where the fuel distribution port member 22 of the intake manifold is joined to the fuel intake port member 20 of the cylinder head in place of the second prior art sealing arrangement of FIGS. 5 and 6. The two step down ledges 28, 30 of the port members are disposed into at least substantial alignment and in contact or at least close proximity to one another as in the prior art assembly, but no O ring is disposed in the space defined by the two step down ledges as in the prior art sealing arrangement. It is understood that the intake manifold is sealed to a second cylinder head (not shown) in this same manner.

In both prior art versions of an intake manifold 11, 15 the fuel distribution port members 22, 24 have a length of about 0, 375 (⅜) inch as indicated at dimension B in FIG. 1, and in both of the prior art versions the cylinder head 10, 14 the fuel intake port members 20 have a length of about 0, 375 (⅜) inch as indicated at dimension A in FIG. 1. The elastomeric band(s) 18 have a longitudinal length that is longer than the length of either of the fuel distribution port member or the fuel intake port member but not shorter than the combined lengths of the fuel distribution port member and the fuel intake port member. In a prototype the reinforced silicone band had a longitudinal length of about 0.85 inch. This accounts for the small gap between the port members 20, 22 shown in FIGS. 9 and 10 and facilitates the process of assembling the intake manifold to the cylinder heads.

Each of the circular clamps 17 has a longitudinal length that is less than the longitudinal length of either of the fuel distribution port members or the fuel intake port member, for example in a prototype kit each circular clamp has a longitudinal length of about 0.31 (⁵⁄₁₆) inch. Put another way, each of the circular clamps in the new kit has a longitudinal length that is less than one half of the longitudinal length of an elastomeric band in the new kit.

As clearly shown in FIGS. 8-10 when installed in an operative position extending circumferentially around the outer surface of the elastomeric band the circular clamps 17 are spaced apart with the elastomeric band visible in a gap between the circular clamps. Each circular clamp of the kit has a location when properly installed that overlies only either a fuel distribution port member or a fuel intake port member. Even if one of the port members has an outer diameter at or near the minimum specified tolerance and the other port member has an outer diameter at or near the maximum specified tolerance a good seal of the joint is achieved by this arrangement of the two circular clamps.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A kit for maintaining a seal of a first joint of a first fuel intake port member of a first cylinder head and a seal of a second joint of a second fuel intake port member of a second cylinder head and a pair of fuel distribution port members of an intake manifold of a motorcycle with a panhead, ironhead or shovelhead engine, the kit comprising two fiber reinforced silicone elastomeric bands and four circular clamps, the elastomeric bands each having a first longitudinal length and each of the circular clamps each having a second longitudinal length that is less than one half of the longitudinal length of the elastomeric bands, wherein each circular clamp of the kit is configured to be installed over only one of a fuel distribution port member or a fuel intake port member, and wherein each of the circular clamps has a longitudinal length that is less than one half of the longitudinal length of each elastomeric band.

2. A kit for maintaining a seal of a first joint of a first fuel intake port member of a first cylinder head and a seal of a second joint of a second fuel intake port member of a second cylinder head and a pair of fuel distribution port members of an intake manifold of a motorcycle with a panhead, ironhead or shovelhead engine, wherein the fuel intake port members each have a longitudinal length and the fuel distribution port members each have a longitudinal length, the kit comprising two fiber reinforced silicone elastomeric bands and four circular clamps, the elastomeric bands each having a longitudinal length that is longer than the length of either of the fuel distribution port members or the fuel intake port members but not shorter than the combined longitudinal lengths of one of the fuel distribution port members and one of the fuel intake port members, and each of the circular clamps has a longitudinal length that is less than the longitudinal length of any of the fuel distribution port members or any of the intake port members, wherein each circular clamp of the kit is configured to be installed over only one of a fuel distribution port member or a fuel intake port member, and wherein each of the circular clamps has a longitudinal length that is less than one half of the longitudinal length of each elastomeric band.

3. The kit of claim 2 wherein each elastomeric band has a longitudinal length that is greater than the combined longitudinal lengths of one of the fuel distribution port member and one of the fuel intake port members.

* * * * *